United States Statutory Invention Registration [19]

[11] Reg. Number: H1004

Sasaki et al. [43] Published: Dec. 3, 1991

[54] THERMOPLASTIC RESIN COMPOSITION

[75] Inventors: Isao Sasaki, Hiroshima; Kozi Nishida, Toyama; Hisao Anzai, Ohtake, all of Japan

[73] Assignee: Mitsubishi Rayon Company Limited, Tokyo, Japan

[21] Appl. No.: 381,478

[22] Filed: Jul. 18, 1989

[30] Foreign Application Priority Data

Aug. 4, 1988 [JP] Japan ..... 63-194822
Aug. 4, 1988 [JP] Japan ..... 63-194823

[51] Int. Cl.[5] ..... C08F 8/00
[52] U.S. Cl. ..... 525/132
[58] Field of Search ..... 525/132

[56] References Cited

U.S. PATENT DOCUMENTS 2,146,209 2/1939 Graves ..... 260/2
4,246,374 1/1981 Kopchik ..... 525/329
4,727,117 2/1988 Hallden-Abberton et al. .... 525/343
4,745,159 5/1988 Anzai et al. ..... 525/329.9

*Primary Examiner*—Richard D. Lovering
*Assistant Examiner*—C. Harris
*Attorney, Agent, or Firm*—Brumbaugh, Graves, Donohue & Raymond

[57] ABSTRACT

A thermoplastic resin composition comprising:
(A) 1–99 parts by weight of polymethacrylimide and
(B) 99–1 parts by weight of ethylene-ethyl acrylate copolymer, polyamide-imide, polyether-ether ketone, or polyether sulfone. The thermoplastic resin composition has a high impact strength as well as good processability.

1 Claim, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

THERMOPLASTIC RESIN COMPOSITION

BACKGROUND OF THE INVENTION

1. Field of the Invention

The present invention relates to a thermoplastic resin composition comprising a methacrylimide group-containing polymer and a thermoplastic resin, and having superior heat resistance, mechanical properties, and processability.

2. Description of the Prior Art

Methacrylimide group-containing polymers are excellent in heat resistance, clarity, heat distortion temperature, stiffness, surface hardness, and processability. However, they are poor in mechanical properties represented by impact strength. Therefore, they are limited in their application as a molding material by themselves.

On the other hand, thermoplastic resins such as ethylene-ethyl acrylate copolymer, polyamide-imide, polyether-ether ketone, and polyether sulfone are superior in mechanical properties such as tensile strength, bending strength, and impact strength, and thermal properties such as heat distortion temperature and thermal decomposition temperature. They are expected to find use in broad application areas as injection moldings, extrusion moldings, and engineering plastics. Unfortunately, however, they have such a high heat distortion temperature that they need a high molding temperature and hence they are required to be improved in processability.

As a result of studies for improving low mechanical strength which is a disadvantage of the methacrylimide group-containing polymers and also for improving poor processability which is a disadvantage of the thermoplastic resins, it has been found that the objects are achieved by blending the thermoplastic resins with a methacrylimide group-containing polymer.

SUMMARY OF THE INVENTION

The present invention is to provide a thermoplastic resin composition comprising:

(A) 1–99 parts by weight of a polymer containing at least 10% by weight of methacrylimide units represented by the formula (I) below

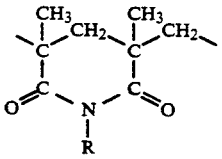

(I)

(wherein R denotes a hydrogen atom or an aliphatic, aromatic, or alicyclic hydrocarbon group having 1–20 carbon atoms.), and (B) 99–1 parts by weight of at least one kind of thermoplastic resin selected from the group consisting of ethylene-ethyl acrylate copolymer, polyamide-imide, polyether-ether ketone, and polyether sulfone, (with the total amount of (A) and (B) being 100 parts by weight).

In an embodiment of the present invention, 99–1 parts by weight of at least one kind of thermoplastic resin (B') selected from the group consisting of styrene-maleimide copolymer, polyphenylene ether-polystyrene blend polymer, polyaryl ester (all aromatic polyester), and polyether imide may be used in place of the thermoplastic resin (B).

DESCRIPTION OF THE PREFERRED EMBODIMENTS

The component (A) used in the present invention is a methacrylimide group-containing polymer containing the methacrylimide unit represented by the formula (I) above. It may be a homopolymer or a copolymer. Methacrylimide group-containing polymers having any chemical structure may achieve the purpose of the present invention so long as they have the methacrylimide unit represented by the formula (I). Generally, a hydrogen atom, methyl group, ethyl group, propyl group, butyl group, or phenyl group is preferably used as R in the formula (I).

The methacrylimide group-containing polymer used in the present invention may be produced in any known processes. It may be produced by, for example, reacting a methacrylic resin (such as polymethyl methacrylate) with ammonia or a primary amine (such as methylamine and ethylamine) in a proper solvent (such as aromatic hydrocarbons including benzene, toluene, and xylene, and alcohols including methanol, ethanol, and propanol, alone or in combination) at 170°–350° C., preferably 200°–300° C., in an autoclave, thereby forming the methacrylimide ring. The reaction may be carried out in an extruder as disclosed in U.S. Pat. No. 4,246,374.

The methacrylimide group-containing polymer used in the present invention should contain at least 10% by weight, preferably more than 20% by weight of the methacrylimide unit. With a content less than 10% by weight, the polymer does not exhibit its inherent heat resistance.

While the reaction of polymethyl methacrylate with ammonia or a primary amine was explained above as an example for producing the methacrylimide group-containing polymer, it is well known that the resulting polymer contains an intermediate (such as methacrylic acid and acid anhydride) of the imidization reaction as a by-product. (See European Patent 0 216 505.) The formation of such a by-product may be controlled by establishing an adequate reaction condition such as reaction temperature, or by employing methyl methacrylate-methacrylic acid copolymer as well as polymethyl methacrylate as the starting material.

The methacrylimide group-containing polymer used to make the thermoplastic resin composition of the present invention may contain the above-mentioned by-product in the form of acid functional group and/or acid anhydride functional group in an amount in excess of 0.4 milliequivalents for the polymer. With an amount less than 0.4 milliequivalents, the methacrylimide group-containing polymer tends to be hardly readily miscible with the above-mentioned thermoplastic resin and hence it may not contribute to the improvement of processability of the thermoplastic resins. (The reason for this is not elucidated yet.) Upper limit of the amount of the acid functional group and/or acid anhydride functional group is preferably 1.2 milliequivalents so that the resin composition of the present invention keeps its water resistance intact.

The component (B) used in the present invention is one or more than one kind of thermoplastic resin selected from the group consisting of ethyleneethyl acrylate copolymer, polyamide-imide, polyetherether ketone, and polyether sulfone. High impact polystyrene, styrene-maleimide copolymer, polyphenylene ether and polyaryl ester can be used as the component B or additional component.

The polyamide-imide includes, for example, one which is obtained by reacting trimellitic anhydride with an aromatic or aliphatic diamine. The polyetherether ketone includes, for example, "Victrex PEEK" available from I.C.I. The polyether sulfone includes, for example, "Polyether sulfone 420P" available from I.C.I.

The thermoplastic resin composition of the present invention is composed of 1–99 parts by weight of said methacrylimide group-containing polymer (A) and 1–99 parts by weight of at least one kind of said thermoplastic resin (B), with the total amount of (A) and (B) being 100 parts by weight. The amount of component (A) should preferably be 20–80 parts by weight and the amount of component (B) should preferably be 20–80 parts by weight, so that the resulting thermoplastic resin composition exhibits the superior processability inherent in the methacrylimide group-containing polymer (A) and the superior mechanical properties inherent in the thermoplastic resin (B).

The methacrylimide group-containing polymer (A) and the thermoplastic resin (B) may be mixed with each other by melt-mixing them in the shape of granules, powder, or chips using a V-blender, supermixer, or kneader.

In the present invention, at least one kind of thermoplastic resin (B') selected from the group consisting of styrene-maleimide copolymer, polyphenylene ether-polystyrene blend polymer, polyaryl ester (all aromatic polyester), and polyether imide may be used in place of the thermoplastic resin (B).

The thermoplastic resin composition of the present invention may be incorporated with a heat stabilizer, antioxidant, and UV ray absorber to improve heat resistance, oxidation resistance, and light resistance, respectively. It may also be incorporated with a plasticizer, pigment, and lubricant. In addition, it may be reinforced with a fibrous material such as glass fibers and carbon fibers.

The thermoplastic resin composition of the present invention may be formed into a variety of moldings by the known plastic molding process such as press molding, injection molding, and extrusion molding.

The thermoplastic resin composition of the present invention may be given improved mechanical properties represented by impact strength when it is incorporated with an impact resistant resin and a rubbery polymer as an impact modifier, the former including acrylonitrile-butadiene-styrene terpolymer (ABS resin), methyl methacrylate-butadiene-styrene terpolymer (MBS resin), ethylene-propylene-diene rubber (EPDM), and acrylonitrile-styrene graft copolymer (AES resin), and the latter including ethylene ionomer resin, modified polyethylene containing glycidyl ester groups, polyether ester, polyether ester amide, and polyether amide. In addition, to impart desired properties to the resin composition of the present invention, it may be incorporated with other thermoplastic resins such as styrene-acrylonitrile copolymer (SAN resin), styrene-methyl methacrylateacrylonitrile copolymer, and α-methylstyrene-styreneacrylonitrile copolymer.

EXAMPLES

The present invention will now be described in more detail with reference to Examples, but the present invention is not limited to them. In the following Examples, the term "parts" and "%" mean "parts by weight" and "% by weight", respectively.

In Examples, the physical properties of the polymers were measured according to the following methods.

(1) Heat distortion temperature: ASTM D-648-56 (with a load of 18.6 kg/cm$^2$).

(2) Izod impact strength: ASTM D-256-56, Method A.

(3) Melt index: ASTM D-1238 (g/10 min, at 260° C. and 300° C. under a 10-kg load).

(4) Imide content (mol %) in the methacrylimide group-containing polymer was measured by the nitrogen content by the elementary analysis by CHN corder (Model MT-3, made by Yanagimoto Seisakusho), and the proton NMR JNM-FX-100 (JEOL) spectrometer at 100 MHz.

(5) Intrinsic viscosity of the polymer was calculated from the relative viscosity ($\eta_{rel}$) of the polymer according to the formula below.

$$\text{Intrinsic viscosity} = \lim_{c \to 0} (\ln \eta_{rel})/C \text{ (dl/g)}$$

wherein C denotes the amount in gram of the polymer in 100 ml of solvent.)

The relative viscosity of the polymer is obtained from $t_s/t_o$, where ts is the time required for a 0.5% by weight chloroform solution of the polymer sample to flow through a Deereax-Bishoff viscometer at 25 ±0.1° C., and $t_o$ is the time required for chloroform to flow through the viscometer at the same temperature.

(6) Content of acid functional group and acid anhydride functional group in the methacrylimide group-containing polymer: Polymer was sampled, dissolved in 50 ml of dimethyl formamide. Then, the solution was subjected to conductimetric neutralization titration with 0.1N KOH methanol under stirring to obtain equivalent value.

Preparation of methacrylimide group-containing polymer

Samples of the methacrylimide group-containing polymer were prepared by the following methods.

Sample polymer A-1

A 10-liter reactor equipped with a paddle spiral stirrer, pressure gauge, sample charger, and jacketed heater was charged with 100 parts of sufficiently dried methyl methacrylate polymer (having an intrinsic viscosity of 0.51), 90 parts of toluene, and 10 parts of methanol. With the atmosphere in the reactor sufficiently replaced with nitrogen, the contents were heated to 200° C. and stirred for dissolution. To the reactor was added 21.7 parts (0.7 mol) of methylamine from the sample-injecting device. Reaction was carried out for 3 hours at an internal pressure of 60 kg/cm$^2$G. Upon completion of the reaction, there was obtained a methacrylimide group-containing polymer (designated as A-1). The polymer was dried and pulverized for use as a sample.

Sample polymer A-2

A sample of methacrylimide group-containing polymer (designated as A-2) was prepared in the same manner as in the method for Sample polymer A-1, except that the methyl methacrylate polymer was replaced by methyl methacrylate-methacrylic acid (90:10) copolymer (having an intrinsic viscosity of 0.60).

Sample polymer A-3

A sample of methacrylimide group-containing polymer (designated as A-3) was prepared in the same manner as in the method for Sample polymer A-1, except that the methylamine was replaced by 0.7 mol of ammonia.

Sample polymer A-4

A sample of methacrylimide group-containing polymer (designated as A-4) was prepared in the same manner as in the method for Sample polymer A-2, except that the methylamine was replaced by 0.7 mol of ammonia.

Sample polymer A-5

The sample (A-1) of methacrylimide group-containing polymer obtained in the method for Sample polymer A-1 was dissolved in tetrahydrofuran and the resulting solution was bubbled with diazomethane gas for the alkylation of the acid component and the acid anhydride component.

The samples (A-1 to A-5) of methacrylimide group-containing polymers obtained were tested for properties. The results are shown in Table 1.

TABLE 1

| Referential Example No. | Raw material polymer for imidizing reaction | Amount imidized (mol %) | Amount of acid and acid anhydride (milli-equivalent) | Heat distortion temperature (°C.) | Melt index 260° C., 10 kg load (g/10 min) |
|---|---|---|---|---|---|
| A-1 | MMA polymer | 70 | 0.45 | 150 | 10 |
| A-2 | MMA-MAA copolymer | 75 | 0.50 | 155 | 9 |
| A-3 | MMA polymer | 65 | 0.50 | 190 | 3 |
| A-4 | MMA-MAA copolymer | 70 | 0.60 | 197 | 2 |
| A-5 | MMA polymer | 70 | 0.1 | 147 | 10 |

MMA: methyl methacrylate
MAA: methacrylic acid

Thermoplastic resins B

The thermoplastic resins (B) used in Examples were made ready as follows:

B-1: Aromatic polyester copolymer ("U-polymer U-100", made by Unitica, Ltd.)

B-2: Polyamide-imide ("Torlon 4203L", made by Mitsubishi Chemical Industries, Ltd.)

B-3: Polysulfone polymer ("Mardel Polysulfone P-1700", Nissan Chemical Industries, Ltd.)

B-4: Polyether-ether ketone polymer ("PEEK Natural", made by I.C.I.)

B-5: Polyether imide polymer ("Ultem 1000", made by General Electric Company.)

B-6: Polyether sulfone polymer ("Polyether sulfone 420P", made by I.C.I.)

Other thermoplastic resins C

Other thermoplastic resins than the thermoplastic resin (B) were made ready as follows:

C-1: ABS resin obtained by polymerizing 22.5 parts of styrene and 7.5 parts of acrylonitrile in the presence of 70 parts of polybutadiene rubber.

C-2: Polyether ester obtained by polycondensing 91.5 parts of dimethyl terephthalate, 41.5 parts of dimethyl isophthalate, 38.5 parts of poly(tetramethyleneoxide) glycol, and 94.5 parts of 1,4-butanediol by the aid of 0.1 parts of titanium butoxide catalyst.

EXAMPLES 1 to 6

Six kinds of polymers in pellet shape were prepared by extrusion from mixtures each composed of 30 parts of the methacrylimide group containing polymer (A-1) and 70 parts of the thermoplastic resins (B-1 to B-6). Mixing was performed for 20 minutes using a V-blender and the mixture was dried prior to extrusion.

Each polymer mixture was made into a spiral test piece by injection molding under the conditions shown below to evaluate the moldability. The moldability is expressed in terms of the molding temperature to give a spiral length of 15 cm. The results are shown in Table 2. The thermoplastic resins (B) were also tested for moldability. The results are shown in Table 2.

Conditions of injection molding:

Injection molding machine: Toshiba IS-60 (5-ounce)
Mold temperature: 150° C.
Spiral thickness: 2 mm It is noted from Table 2 that the resin composition composed of the methacrylimide group-containing polymer (A-1) and one of the thermoplastic resins (B-1 to B-6) can be molded at molding temperatures which are 50°-60° C. lower than those of the thermoplastic resins used alone.

TABLE 2

| Example No. | Mixing ratio: Methacrylimide group-containing polymer (A) Designation | (parts) | Thermoplastic resin (B) Designation | (parts) | Molding temperature (°C.) | Injection pressure (kg/cm2) | Decrease of molding temperature (°C.) |
|---|---|---|---|---|---|---|---|
| Example 1 | A-1 | 30 | B-1 | 70 | 300 | 1200 | 50 |

TABLE 2-continued

| Example No. | Mixing ratio: Methacrylimide group-containing polymer (A) Designation | (parts) | Thermoplastic resin (B) Designation | (parts) | Molding temperature (°C.) | Injection pressure (kg/cm2) | Decrease of molding temperature (°C.) |
|---|---|---|---|---|---|---|---|
| | | | B-1 | 100 | 350 | 1200 | |
| Example 2 | A-1 | 30 | B-2 | 70 | 310 | 2500 | 60 |
| | | | B-2 | 100 | 370 | 2500 | |
| Example 3* | A-1 | 30 | B-3 | 70 | 300 | 1500 | 50 |
| | | | B-3 | 100 | 350 | 1500 | |
| Example 4 | A-1 | 30 | B-4 | 70 | 330 | 1300 | 60 |
| | | | B-4 | 100 | 390 | 1300 | |
| Example 5 | A-1 | 30 | B-5 | 70 | 330 | 1200 | 50 |
| | | | B-5 | 100 | 380 | 1200 | |
| Example 6 | A-1 | 30 | B-6 | 70 | 310 | 1500 | 50 |
| | | | B-6 | 100 | 360 | 1500 | |

Decrease of molding temperature: The difference between the molding temperature for the thermoplastic resin (B) to give a spiral length of 15 cm and the molding temperature for the resin composition (A + B) of the invention to give a spiral length of 15 cm.

*Example 3 is a Referential example.

EXAMPLES 7 to 15 and COMPARATIVE EXAMPLES 1 to 5

Resin compositions were prepared from the methacrylimide group-containing polymers (A-1 to A-5) obtained and the thermoplastic resin (B-1) in the mixing ratio shown in Table 3. Each of the resin compositions was made into test pieces by injection molding (at a cylinder temperature of 320° C. and a mold temperature of 120° C.). The test pieces were tested for physical properties. The results are shown in Table 3. Examples 7 to 15 are Referential examples.

It is noted from Table 3 that the resin compositions in Examples 7 to 9 are superior in physical properties, heat resistance, and moldability to those in Examples 13 to 15 which contain the polymer A-5.

It is also noted from Table 3 that the resin compositions in Examples 7 to 15 are superior in mechanical properties, heat resistance, and moldability to the polymers A-1 to A-4 and the thermoplastic resin B-1 used by itself in Comparative Examples 1 to 5.

TABLE 3

| Example No. | Mixing ratio: Methacrylimide group-containing polymer (A) Designation | (parts) | Thermoplastic resin (B) (parts) | Physical properties: Heat distortion temperature (°C.) | Izod impact strength (kg · cm/cm²) | Melt index at 300° C., 10-kg load (g/10 min) |
|---|---|---|---|---|---|---|
| Example 7 | A-1 | 20 | 80 | 173 | 30 | 9 |
| Example 8 | A-1 | 50 | 50 | 163 | 13 | 15 |
| Example 9 | A-1 | 80 | 20 | 155 | 7 | 23 |
| Example 10 | A-2 | 50 | 50 | 165 | 17 | 14 |
| Example 11 | A-3 | 50 | 50 | 180 | 7 | 5 |
| Example 12 | A-4 | 50 | 50 | 185 | 10 | 4 |
| Example 13 | A-5 | 20 | 80 | 170 | 20 | 7 |
| Example 14 | A-5 | 50 | 50 | 160 | 5 | 10 |
| Example 15 | A-5 | 80 | 20 | 150 | 3 | 18 |
| Comp. Ex 1 | A-1 | 100 | 0 | 150 | 1.7 | 30 |
| Comp. Ex. 2 | — | — | 100 | 175 | 38 | 1 |
| Comp. Ex. 3 | A-2 | 100 | 0 | 155 | 1.7 | 24 |
| Comp. Ex. 4 | A-3 | 100 | 0 | 190 | 1.5 | 9 |
| Comp. Ex. 5 | A-4 | 100 | 0 | 197 | 1.5 | 6 |

EXAMPLES 16 to 20

Resin compositions were prepared from the methacrylimide group-containing polymer (A-1), the thermoplastic resin (B-3), and other thermoplastic resins (C-1 or C-2) in the mixing ratio shown in Table 4. Each of the resin compositions was made into test pieces by injection molding and they were tested for physical properties in the same manner as in Example 1. The results are shown in Table 4. Examples 16 to 20 are Referential examples.

TABLE 4

| Example No. | Mixing ratio: Methacrylimide group-containing polymer (A-1) (parts) | Mixing ratio: Thermo-plastic resin (B-1) (parts) | Mixing ratio: Other thermo-plastic resin (C) (parts) | Physical properties: Heat distortion tempera-ture (°C.) | Physical properties: Izod impact strength (kg · cm/cm²) |
|---|---|---|---|---|---|
| Example 16 | 35 | 35 | C-1 30 | 135 | 20 |
| Example 17 | 40 | 40 | C-1 20 | 140 | 15 |
| Example 18 | 35 | 35 | C-2 30 | 130 | 15 |
| Example 19 | 30 | 30 | C-2 40 | 125 | 17 |
| Example 20 | 35 | 35 | C-1/C-2 15/15 | 140 | 25 |

EXAMPLE 21

A resin composition was prepared from 70 parts of the methacrylimide group-containing polymer (A-1) and 30 parts of a polyphenylene ether-polystyrene blend resin ("Noryl 731J", made by General Electric Co., Ltd.). This resin composition was made into a test piece by injection molding and tested to find the heat distortion temperature of 148° C.

We claim:

1. A thermoplastic resin composition which comprises:

(A) 1–99 parts by weight of a polymer containing at least 10% by weight of methacrylimide units represented by the formula (I) below:

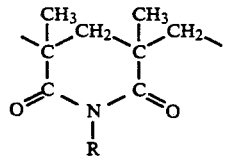

(I)

(wherein R denotes a hydrogen atom or a $C_1$–$C_{20}$ hydrocarbon selected from the group consisting of aliphatic, aromatic or alicyclic hydrocarbons) and polymer by-products having functional groups selected from the group consisting of acid functional groups, acid anhydride functional groups, and mixtures thereof wherein the acid functional groups and acid anhydride functional groups in the polymer by-product are more than 0.4 milliequivalents for the polymer, and (B) 99–1 parts by weight of at least one kind of thermoplastic resin selected from the group consisting of styrene-maleimide copolymer, polyphenylene ether-polystyrene blend polymer, polyaryl ester (all aromatic polyester), and polyether imide (with the total amount of (A) and (B) being 100 parts by weight).

* * * * *